(12) United States Patent
Lin et al.

(10) Patent No.: US 11,462,049 B2
(45) Date of Patent: Oct. 4, 2022

(54) FINGERPRINT IDENTIFICATION APPARATUS

(71) Applicant: FOCALTECH ELECTRONICS LTD., Grand Cayman (KY)

(72) Inventors: Jhe-Syuan Lin, Hsinchu County (TW); Chia-Ming Yeh, Hsinchu County (TW); Wen-Chen Lee, Hsinchu County (TW); Chia-Yuan Hsiao, Hsinchu County (TW); Chun-Hung Yen, Hsinchu County (TW)

(73) Assignee: FOCALTECH ELECTRONICS LTD., Grand Cayman (KY)

(*) Notice: Subject to any disclaimer, the term of this patent is extended or adjusted under 35 U.S.C. 154(b) by 0 days.

(21) Appl. No.: 17/242,307

(22) Filed: Apr. 28, 2021

(65) Prior Publication Data
US 2021/0334512 A1 Oct. 28, 2021

Related U.S. Application Data

(60) Provisional application No. 63/016,302, filed on Apr. 28, 2020.

(30) Foreign Application Priority Data

Apr. 12, 2021 (TW) .................................. 110113013

(51) Int. Cl.
*G06V 40/13* (2022.01)
*G06V 40/12* (2022.01)

(52) U.S. Cl.
CPC ...... *G06V 40/1365* (2022.01); *G06V 40/1318* (2022.01); *G06V 40/1324* (2022.01)

(58) Field of Classification Search
None
See application file for complete search history.

(56) References Cited

U.S. PATENT DOCUMENTS

| 5,986,746 | A | * | 11/1999 | Metz | .................... | A61B 5/1172 |
| | | | | | | 356/71 |
| 2018/0005005 | A1 | * | 1/2018 | He | ........................ | G06F 3/0418 |
| 2019/0228203 | A1 | * | 7/2019 | Kim | .................... | G06V 40/1329 |
| 2021/0081639 | A1 | * | 3/2021 | Sun | .................... | G06V 40/1324 |
| 2021/0174053 | A1 | * | 6/2021 | Nam | .................. | G06V 40/1359 |

FOREIGN PATENT DOCUMENTS

CN 107292216 A 10/2017

* cited by examiner

*Primary Examiner* — Joseph R Haley
(74) *Attorney, Agent, or Firm* — Muncy, Geissler, Olds and Lowe, P.C.

(57) ABSTRACT

A fingerprint identification apparatus, including a light path adjustment element, an optical filter layer, and an image sensor, is provided. The light path adjustment element is disposed on a transmission path of an image beam from a fingerprint of a user. The optical filter layer is disposed on a transmission path of the image beam from the light path adjustment element. The optical filter layer has openings. An inclined image beam in the image beam is obliquely incident to the light path adjustment element. The light path adjustment element adjusts a light path of the inclined image beam to be transmitted to the openings along a normal direction. The image sensor is disposed on a transmission path of the image beam from the optical filter layer. The image sensor has pixels. Positions of the pixels respectively correspond to positions of the openings.

6 Claims, 6 Drawing Sheets

FINGERPRINT IDENTIFICATION APPARATUS

CROSS-REFERENCE TO RELATED APPLICATION

This application claims the priority benefit of U.S. Provisional Application No. 63/016,302, filed on Apr. 28, 2020 and Taiwan Application No. 110113013, filed on Apr. 12, 2021. The entirety of each of the above-mentioned patent applications is hereby incorporated by reference herein and made a part of this specification.

BACKGROUND

Technical Field

The invention relates to a fingerprint identification apparatus, and particularly relates to an optical fingerprint identification apparatus.

Description of Related Art

Today's under-screen fingerprint identification apparatus mainly collects reflected light formed by light irradiating a finger, where the reflected light carries image information of fingerprint peaks and troughs, and then the under-screen fingerprint identification apparatus uses the reflected light to perform fingerprint identification. In a current collimated under-screen fingerprint identification technology, the way that an image sensor receives signal light is mainly to receive a light beam directly above, but in this way, the contrast between the fingerprint peaks and the fingerprint troughs is relatively low, resulting in a greater burden on post-end image processing.

SUMMARY

The invention is directed to a fingerprint identification apparatus, which is adapted to provide a fingerprint identification effect with good contrast.

An embodiment of the invention provides a fingerprint identification apparatus including a light path adjustment element, an optical filter layer and an image sensor. The light path adjustment element is disposed on a transmission path of an image beam from a fingerprint of a user. The optical filter layer is disposed on a transmission path of the image beam from the light path adjustment element. The optical filter layer has a plurality of openings. An inclined image beam in the image beam is obliquely incident to the light path adjustment element. The light path adjustment element adjusts a light path of the inclined image beam to be transmitted to the openings along a normal direction. The image sensor is disposed on a transmission path of the image beam from the optical filter layer. The image sensor has a plurality of pixels, and positions of the pixels respectively correspond to positions of the openings.

In an embodiment of the invention, the light path adjustment element is an optical diffraction plate. The optical diffraction plate is configured to enable the inclined image beam to be incident to the optical diffraction plate in a reverse tracking manner of first-order light of the optical diffraction plate.

In an embodiment of the invention, the light path adjustment element includes a plurality of prisms and a transparent substrate. The prisms are disposed on a surface of the transparent substrate. Each prism has a bottom surface, a side surface, and an inclined surface that are connected in pairs. The bottom surface is in contact with the surface of the transparent substrate. The inclined image beam is incident from the side surface of each prism, and is reflected by the inclined surface to sequentially penetrate the bottom surface and the transparent substrate to emit out of the light path adjustment element.

In an embodiment of the invention, an orthographic projection of each prism overlaps with an orthographic projection of one of the openings.

In an embodiment of the invention, an orthographic projection of each prism overlaps with orthographic projections of at least two of the openings.

In an embodiment of the invention, the image beam further includes a normal image beam. The normal image beam is normally incident to the light path adjustment element. The light path adjustment element adjusts a light path of the normal image beam to be emitted out of the light path adjustment element in an inclined direction different from the normal direction.

In an embodiment of the invention, the openings are arranged in a random periodic arrangement, an array arrangement, a concentric arrangement or a hexagonal closest packing arrangement.

In an embodiment of the invention, a type of the image sensor includes a complementary metal oxide semiconductor image sensor or a charge-coupled device image sensor.

In an embodiment of the invention, the fingerprint identification apparatus is integrated in an electronic device. The electronic device includes a light source, and the light source is configured to emit a light beam to the fingerprint of the user, and the light beam is reflected by the fingerprint of the user to form the image beam.

Based on the above description, in the fingerprint identification apparatus of the embodiment of the invention, the internal light path adjustment element is capable of adjusting the light path of the inclined image beam in the image beam, so that the image sensor may use the inclined image beam as a source for sensing image information. Therefore, the image information sensed by the image sensor has good contrast, and a fingerprint identification effect is good.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
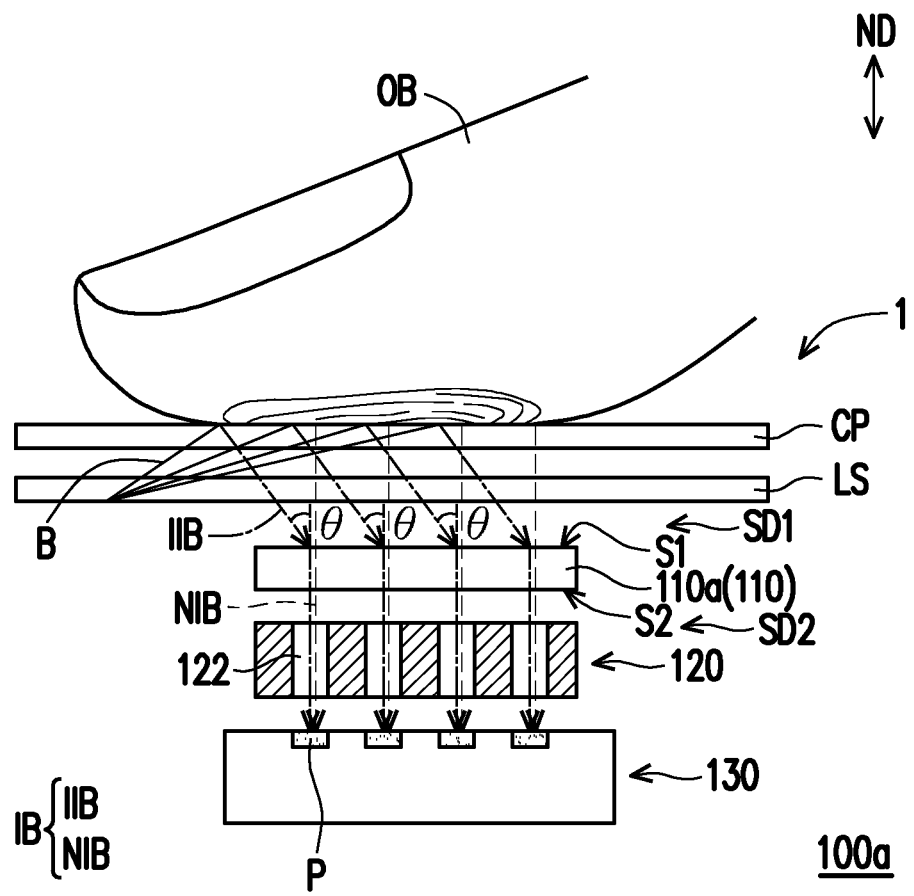
FIG. 1A is a schematic cross-sectional view of a fingerprint identification apparatus according to an embodiment of the invention.

FIG. 1A is a schematic cross-sectional view of a fingerprint identification apparatus according to an embodiment of the invention.

Referring to FIG. 1A, in the embodiment, a fingerprint identification apparatus 100a includes a light path adjustment element 110, an optical filter layer 120, and an image sensor 130, which may be integrated in an electronic device 1. The electronic device 1 is, for example, a mobile phone or other suitable electronic devices, which is not limited by the invention. In addition to the fingerprint identification apparatus 100a, the electronic device 1 further includes, for example, a light source LS and a transparent cover plate CP. The above components are explained in detail in the following paragraphs.

Referring to FIG. 1A, the light path adjustment element 110 generally refers to an optical element that may adjust a light path of a light beam through optical effects such as reflection, diffraction, or penetration, etc. In the embodiment, the light path adjustment element 110 is embodied as an optical diffraction plate 110a with a diffractive effect, and has first and second surfaces S1 and S2 opposite to each other, where the first surface S1 faces a first side SD1 (an upper side), and the second surface S2 faces a second side SD2 (a lower side).

Figure 2A:
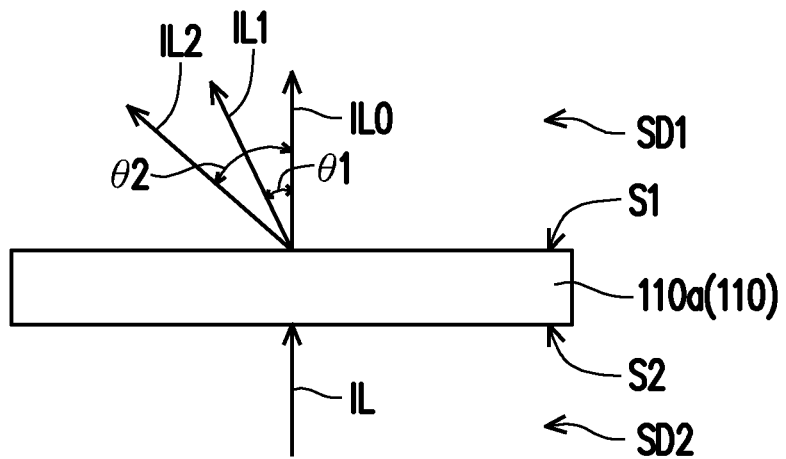
FIG. 2A is a schematic diagram of a light path of an optical diffraction plate in FIG. 1A.
Figure 2A:
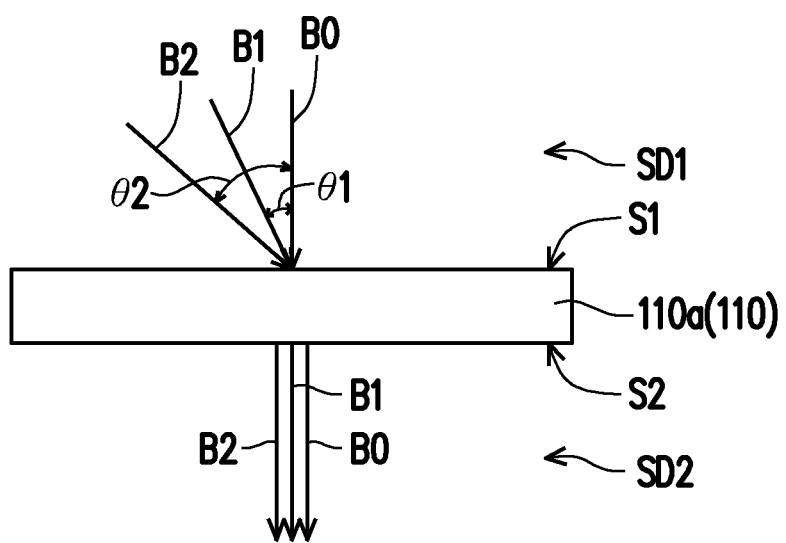
Figure 2B:
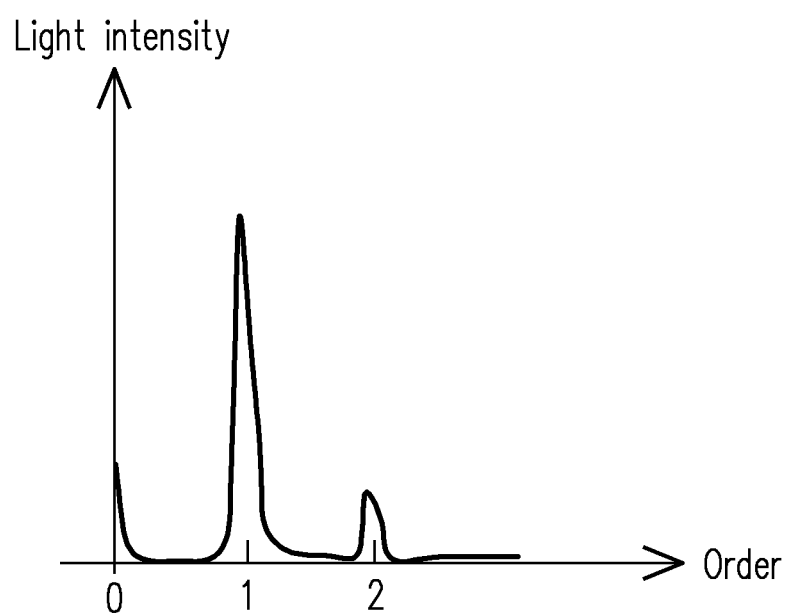
FIG. 2B is a diagram illustrating a light intensity distribution of the optical diffraction plate of FIG. 2A at different order light.

Referring to an upper part of FIG. 2A, when incident light IL is incident to the optical diffraction plate 110a from the second side SD2, the incident light IL may be diffracted by the optical diffraction plate 110a to form 0 to multi-order light. For simplicity's sake, only 0-order light IL0, first-order light IL1, and second-order light IL2 are shown in FIG. 2A, where the 0-order light IL0 is emitted out in a direction perpendicular to the surface S1, and the first-order light IL1 is emitted out in a direction inclined by an angle $\theta1$ with respect to a normal vector of the surface S1, the second-order light IL2 exits in a direction inclined by an angle $\theta2$ with respect to the normal vector of the surface S1, and other orders of light are omitted and not shown. From FIG. 2B, it is known that a light intensity of the first-order light IL1 is the strongest, and a light intensity of the 0-order light IL0 and a light intensity of the second-order light IL2 are much smaller than the light intensity of the first-order light IL1, so that both of the 0-order light IL0 and the second-order light IL2 are negligible.

Referring to a lower part of FIG. 2A, since light has a reversely tracking characteristic, it is assumed that incident directions of light beams B0, B1, and B2 are respectively the same as opposite directions of emitting directions of the 0-order light IL0, the first-order light IL1, and the second-order light IL2 in the upper part of FIG. 2A, and when the light beams B0, B1, B2 are incident to the optical diffraction plate 110a from the first side SD1, the light beams B0, B1, B2 are all emitted out of the optical diffraction plate 110a in an opposite direction of the incident direction of the incident light IL, but light intensities of the light beams B2 and B0 may be greatly reduced by the optical diffraction plate 110a, and a light intensity of the light beam B1 may maintain a certain level without being greatly reduced.

Figure 1B:
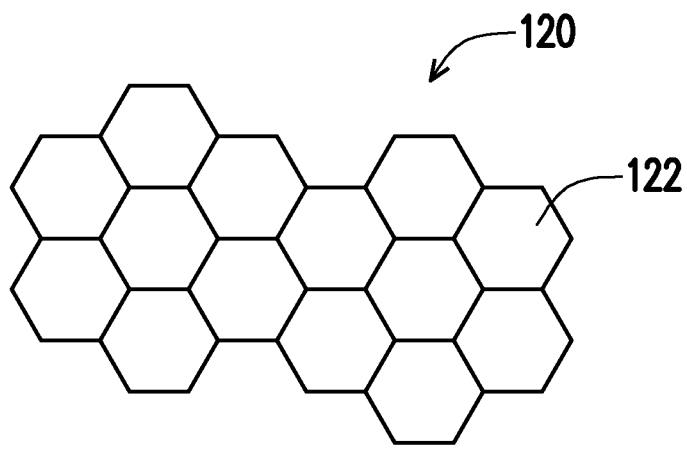
FIG. 1B is a schematic top view of an optical filter layer of an embodiment of the fingerprint identification apparatus of FIG. 1A.

Referring to FIG. 1A, the optical filter layer 120 is made of an opaque material and has a plurality of openings 122 for the light beams to penetrate. A function of the optical filter layer 120 is mainly to allow light beams transmitted in a specific direction to penetrate, while filter other light beams that are not transmitted in the specific direction. To be specific, in the embodiment, the optical filter layer 120 may, for example, transmit light beams transmitted in a normal direction ND, and shields light beams that are not transmitted in the normal direction ND. Therefore, the directions of the light beams emitted out from the optical filter layer 120 are more consistent, and the optical filter layer 120 may also be referred to as a collimation layer. In the embodiment, the arrangement of the openings 122 may be random periodic arrangement, array arrangement, concentric arrangement or hexagonal closest packing arrangement (as shown in FIG. 1B), which is not limited by the invention.

Referring to FIG. 1A, the image sensor 130 is an electronic component that may convert optical signals into electrical signals, thereby converting an image beam from an object into image information. In the embodiment, the image sensor 130 is, for example, a complementary metal oxide semiconductor (CMOS) image sensor, a charge-coupled device (CCD) image sensor, a thin-film transistor image sensor or other suitable type of image sensor, which is not limited by the invention. To be specific, the image sensor 130 has a plurality of pixels P arranged in an array, and a photoelectric conversion element (not shown) that may convert an optical signal into an electrical signal may be configured in each pixel P, where the photoelectric conversion element is, for example, a photodiode, a photogate, or a photoconductor, which is not limited by the invention.

Referring to FIG. 1A, the light source LS is a photoelectric element that may emit a light beam. In the embodiment, the light source LS may be an organic light-emitting diode display panel. In other embodiments, the light source LS may also be a light-emitting element, and the light-emitting element may be a light-emitting diode, an organic light-emitting diode, or other suitable light-emitting elements, which is not limited by the invention.

Referring to FIG. 1A, the transparent cover plate CP is an optical element that is pervious to light beams, and a material thereof is, for example, glass, and the transparent cover plate CP provides a protection function to the aforementioned components. The user may press a finger OB on the transparent cover plate CP.

The configuration of the electronic device 1 will be described in detail in the following paragraphs.

Referring to FIG. 1A, in the electronic device 1, the light source LS is disposed between the transparent cover plate CP and the light path adjustment element 110 of the fingerprint identification apparatus 100a. The light path adjustment element 110 is disposed between the light source LS and the optical filter layer 120, where the light source LS is located on the first side SD1 of the light path adjustment element 110, and the optical filter layer 120 is located on the second side SD2 of the light path adjustment element 110. The optical filter layer 120 is disposed between the light path adjustment element 110 and the image sensor 130. The positions of the plurality of openings 122 of the optical filter layer 120 respectively correspond to the positions of the plurality of pixels P of the image sensor 130.

In the following paragraphs, optical effects of the electronic device 1 are described in detail below with reference of FIG. 1A and FIG. 2A.

Referring to FIG. 1A again, in the electronic device 1, the light source LS is used to emit a light beam B. The light beam B penetrates through the transparent cover plate CP and is transmitted to a fingerprint on the finger OB, and the fingerprint reflects the light beam B to form an image beam IB carrying fingerprint information. According to different incident angles, the image beam IB may be divided into a normal image beam NIB and an inclined image beam IIB. The normal image beam NIB is incident to the light path adjustment element 110 along the normal direction ND, i.e., incident to the surface S1 of the light path adjustment element 110 in a perpendicular manner. The inclined image beam IIB is incident to the light path adjustment element 110 in an inclined manner, i.e., an incident direction thereof and a normal vector of the surface S1 of the light path adjustment element 110 include an angle θ, where the optical diffraction plate 110a is configured to enable the inclined image beam IIB to be incident in a reverse tracking manner of the first-order light of the optical diffraction plate 110a (as shown in the lower part of FIG. 2A). The method of adjusting the light path of the image beam IB by the light path adjustment element 110 is described in detail in the following paragraphs.

Referring to FIG. 1A and FIG. 2A at the same time, when the normal image beam NIB is incident to the optical diffraction plate 110a from the first side SD1, according to the description in the related paragraph of FIG. 2A, since the incident direction of the normal image beam NIB is the same as the incident direction of the light beam B0, after the light intensity of the normal image beam NIB is greatly reduced by the optical diffraction plate 110a, the normal image beam NIB is emitted out of the optical diffraction plate 110a in the normal direction ND, and is transmitted to the pixel P of the image sensor 130 after passing through the opening 122 of the optical filter layer 120. Since the normal image beam NIB is greatly weakened, the pixel P may hardly sense the normal image beam NIB.

Referring to FIG. 1A and FIG. 2A at the same time, when the inclined image beam IIB is incident to the optical diffraction plate 110a, according to the description in the related paragraph of FIG. 2A, the light path of the inclined image beam IIB may adjusted to the normal direction ND by the optical diffraction plate 110a, and the inclined image beam IIB is emitted out of the optical diffraction plate 110a along the normal direction ND. The inclined image beam IIB penetrates through the opening 122 of the optical filter layer 120 and is transmitted to the pixel P of the image sensor 130. Since the inclined image beam IIB is not weakened by the optical diffraction plate 110a and maintains a certain light intensity, the pixel P may sense the inclined image beam IIB and convert an optical signal of the inclined image beam IIB into an electrical signal. In this way, the image sensor 130 may sense a fingerprint pattern through the inclined image beam IIB, and compare the fingerprint pattern with a fingerprint image stored in the system, thereby achieving the function of fingerprint identification.

Figure 3A:
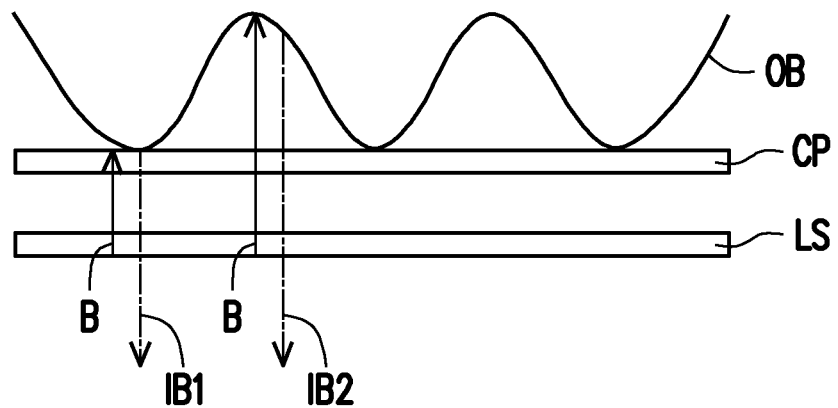
FIG. 3A is a light path schematic diagram of a normal light beam illuminating a finger.
Figure 3B:
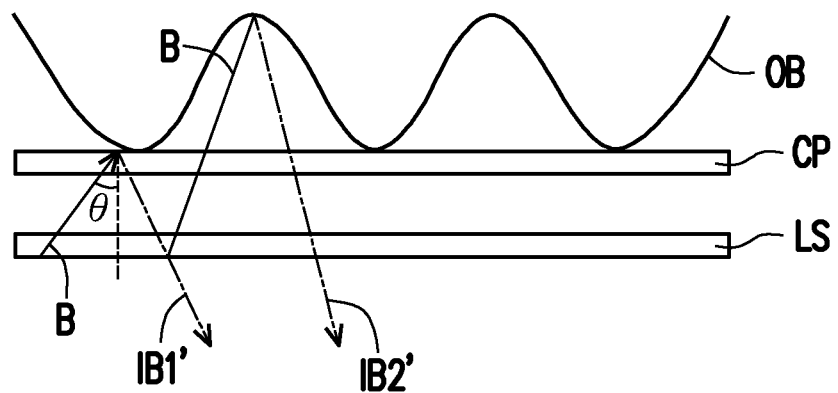
FIG. 3B is a light path schematic diagram of an inclined light beam irradiating the finger.

FIG. 3A is a light path schematic diagram of the normal light beam illuminating the finger. FIG. 3B is a light path schematic diagram of the inclined light beam irradiating the finger.

In order to illustrate the benefits of using the inclined image beam IIB as the source for sensing image information, description is made in the following paragraphs with reference of FIG. 3A and FIG. 3B. The fingerprints of the finger OB in FIG. 3A and FIG. 3B exaggeratedly depict a concave and convex distribution.

Referring to FIG. 3A, when the light beam B respectively irradiates convex and concave parts of the fingerprint in the normal direction, the convex and concave parts of the fingerprint may reflect the light beam B to respectively form image beams IB1 and IB2. Regarding the light beam B, a refractive index (nfr) of irradiating the convex part of the fingerprint is 1.4, a refractive index (nfv) of irradiating the concave part of the fingerprint is 1, and a refractive index of the transparent cover plate CP and the light source LS is 1.5. Through formula calculation, a reflectance R1 of the image beam IB1 reflected by the convex part of the fingerprint is 0.1189%, a reflectance R2 of the image beam IB2 reflected by the concave part of the fingerprint is 4%, and an intensity difference between the image beam IB2 and the image beam IB1 is: R2/R1=(4%/0.1189%)=33.64.

Referring to FIG. 3B, on the other hand, when the light beam B respectively irradiates the convex and concave parts of the fingerprint in an inclined manner, the convex and concave parts of the fingerprint may reflect the light beam B to respectively form image beams IB1' and IB2'. Through formula calculation, it is assumed that θ is equal to 40 degrees, a reflectance R1' of the image beam IB1' reflected by the convex part of the fingerprint is 0.19%, and a reflectance R2' of the image beam IB2' reflected by the concave part of the fingerprint is 24.53%, and an intensity difference between the image beam IB2' and the image beam IB1' is: R2'/R1'=(24.53%/0.19%)=129.

It is known based on the above description that compared to the normal direction manner, the light intensity contrast of the image beams IB1' and IB2' obtained by irradiating the convex and concave parts of the fingerprint in the inclined manner is significantly improved, i.e., the image information of the convex and concave parts with obvious contrast may be obtained by irradiating the fingerprint in the inclined manner. Therefore, in the fingerprint identification apparatus 100a of the embodiment, since the light path adjustment element 110a may guide the inclined image beam IIB in the image beam IB to the image sensor 130, and the image sensor 130 uses the inclined image beam IIB as a source for sensing the image information, the image information sensed by the image sensor 130 has a good contrast and a good fingerprint identification effect, and the burden of image processing is also small.

It should be noted that a part of contents of the aforementioned embodiment is also used in the following embodiment, and descriptions of the same technical contents are omitted. The aforementioned embodiment may be referred for descriptions of the omitted parts, and detailed descriptions thereof are not repeated in the following embodiment.

Figure 4:
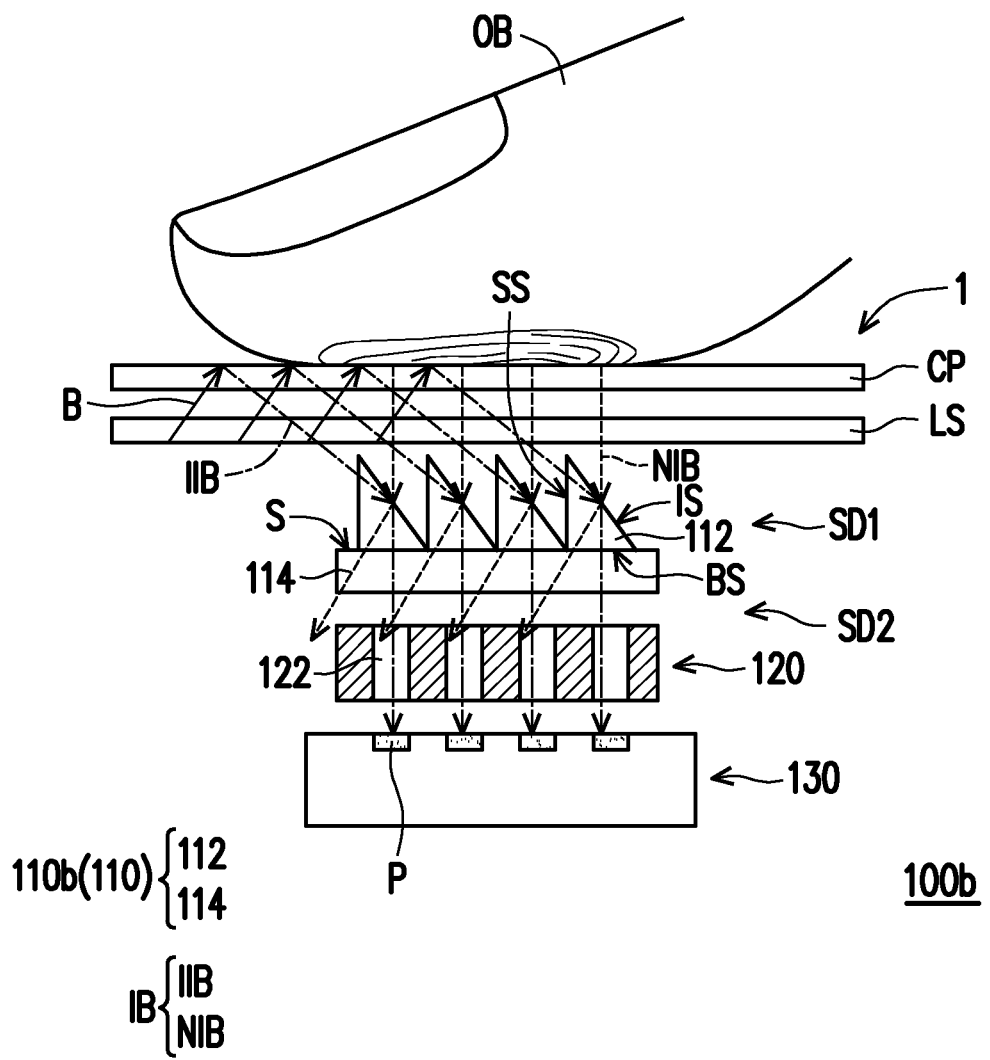
FIG. 4 is a schematic cross-sectional view of a fingerprint identification apparatus according to another embodiment of the invention.

FIG. 4 is a schematic cross-sectional view of a fingerprint identification apparatus according to another embodiment of the invention.

Referring to FIG. 4, a fingerprint identification apparatus 100b of FIG. 4 is substantially similar to the fingerprint identification apparatus 100a of FIG. 1A, and a main difference there between lies in a different pattern of a light path adjustment element 110b, which is, for example, an optical prism array plate. In detail, in the fingerprint identification apparatus 100b, the light path adjustment element 110b includes a plurality of prisms 112 and a transparent substrate 114, where each prism 112 has a bottom surface BS, a side surface SS, and an inclined surface IS connected to each other, and the transparent substrate 114 has a surface S. The prisms 112 are disposed on the surface S of the transparent substrate 114, and the bottom surfaces BS of the prisms 112 are in contact with the surface S of the transparent substrate 114. In addition, an orthographic projection of each prism 112 overlaps with an orthographic projection of the single opening 122.

Referring to FIG. 4 again, when the normal image beam NIB is incident to the light path adjustment element 110b from the first side SD1, the normal image beam NIB is refracted by the inclined surface IS of the prism 112, so that the normal image beam NIB is incident to the opening 122 of the optical filter layer 120 in an inclined direction. Therefore, the normal image beam NIB adjusted by the light path adjusting element 110b may be blocked by the optical filter layer 120 and is not transmitted to the image sensor 130.

Referring to FIG. 4 again, when the inclined image beam IIB is incident to the light path adjustment element 110b, the inclined image beam IIB is incident from the side surface SS of each prism 112 (i.e., the side surface SS is used as an incident surface), and is reflected by the inclined surface IS to sequentially penetrate the bottom surface BS and the transparent substrate 114, and is emitted out of the light path adjusting element 110b. The inclined image beam IIB further penetrates through the opening 122 of the optical filter layer 120 and is transmitted to the pixel P of the image sensor 130.

Figure 5:
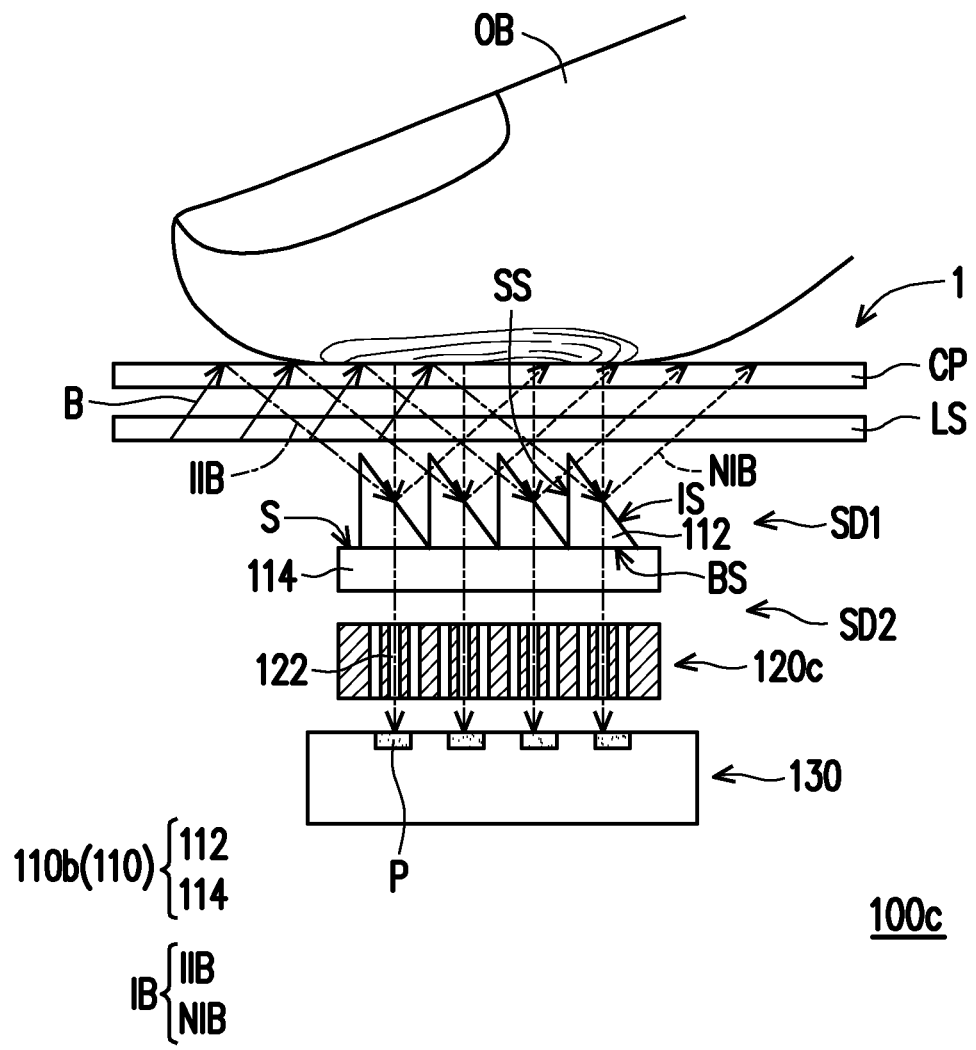
FIG. 5 is a schematic cross-sectional view of a fingerprint identification apparatus according to still another embodiment of the invention.

FIG. 5 is a schematic cross-sectional view of a fingerprint identification apparatus according to still another embodiment of the invention.

Referring to FIG. 5, a fingerprint identification apparatus 100c of FIG. 5 is substantially similar to the fingerprint identification apparatus 100b of FIG. 4, and a main difference there between is that a size relationship between the prism 112 of the light path adjustment element 110b and the opening 122 of an optical filter layer 120c is different. In detail, in the fingerprint identification apparatus 100c, an orthographic projection of the prism 112 overlaps with orthographic projections of at least two openings 122. Through the above design, an alignment problem may be avoided.

In summary, in the fingerprint identification apparatus of the embodiment of the invention, since the light path adjustment element may guide the inclined image beam in the image beam to the image sensor, the image sensor uses the inclined image beam as the source for sensing the image information, and the image information sensed by the image sensor has good contrast and a good fingerprint identification effect, and the burden of image processing is also small.

What is claimed is:

1. A fingerprint identification apparatus, comprising:
a light path adjustment element, disposed on a transmission path of an image beam from a fingerprint of a user;
an optical filter layer, disposed on a transmission path of the image beam from the light path adjustment element and having a plurality of openings,
wherein an inclined image beam in the image beam is obliquely incident to the light path adjustment element, the light path adjustment element adjusts a light path of the inclined image beam to be transmitted to the openings along a normal direction; and
an image sensor, disposed on a transmission path of the image beam from the optical filter layer and having a plurality of pixels, wherein positions of the pixels respectively correspond to positions of the openings,
wherein the light path adjustment element comprises a plurality of prisms and a transparent substrate, the prisms are disposed on a surface of the transparent substrate, wherein each of the prisms has a bottom surface, a side surface, and an inclined surface that are connected in pairs, and the bottom surface is in contact with the surface of the transparent substrate,
wherein an orthographic projection of each of the prisms overlaps with orthographic projections of at least two of the openings separated from each other and extending in a perpendicular manner for alignment with one pixel.

2. The fingerprint identification apparatus as claimed in claim 1, wherein the inclined image beam is incident from the side surface of each of the prisms and is reflected by the inclined surface to sequentially penetrate the bottom surface and the transparent substrate to emit out of the light path adjustment element.

3. The fingerprint identification apparatus as claimed in claim 1, wherein the image beam further comprises a normal image beam, wherein the normal image beam is normally incident to the light path adjustment element, the light path adjustment element adjusts a light path of the normal image beam to be emitted out of the light path adjustment element in an inclined direction different from the normal direction.

4. The fingerprint identification apparatus as claimed in claim 1, wherein the openings are arranged in a random periodic arrangement, an array arrangement, a concentric arrangement, or a hexagonal closest packing arrangement.

5. The fingerprint identification apparatus as claimed in claim 1, wherein a type of the image sensor comprises a complementary metal oxide semiconductor image sensor or a charge-coupled device image sensor.

6. The fingerprint identification apparatus as claimed in claim 1, wherein the fingerprint identification apparatus is integrated in an electronic device, the electronic device comprises a light source, the light source is configured to emit a light beam to the fingerprint of the user, and the light beam is reflected by the fingerprint of the user to form the image beam.

* * * * *